United States Patent [19]

Boeder

[11] 4,373,077
[45] Feb. 8, 1983

[54] ANAEROBICALLY CURING COMPOSITIONS

[75] Inventor: Charles W. Boeder, St. Paul, Minn.

[73] Assignee: Minnesota Mining and Manufacturing Company, Saint Paul, Minn.

[21] Appl. No.: 289,781

[22] Filed: Aug. 3, 1981

Related U.S. Application Data

[63] Continuation-in-part of Ser. No. 203,684, Nov. 3, 1980, abandoned.

[51] Int. Cl.³ ............................................. C08F 20/10
[52] U.S. Cl. .................... 526/309; 526/219; 526/312; 526/313; 526/317; 526/320; 526/323.1; 526/323.2
[58] Field of Search ............... 526/219, 309, 312, 313, 526/317, 320, 323.1, 323.2

[56] References Cited

U.S. PATENT DOCUMENTS

| | | | |
|---|---|---|---|
| 2,558,139 | 6/1951 | Knock et al. | 260/45.5 |
| 2,833,753 | 5/1958 | Lal | 260/89.5 |
| 2,895,950 | 7/1959 | Krieble | 260/89.5 |
| 3,203,941 | 8/1965 | Krieble | 260/89.5 |
| 3,658,624 | 4/1972 | Lees | 156/332 |
| 3,682,875 | 8/1972 | O'Sullivan | 260/89.5 R |
| 3,775,385 | 11/1973 | Ozono et al. | 260/79 |
| 3,795,641 | 3/1974 | Lees et al. | 260/89.5 R |
| 3,957,561 | 5/1976 | Skoultchi | 156/331 |
| 3,962,372 | 6/1976 | Arhart | 260/878 R |
| 3,991,261 | 11/1976 | Gruber et al. | 526/328 |
| 4,005,141 | 1/1977 | Moore et al. | 260/556 F |
| 4,052,244 | 10/1977 | Skoultchi | 156/310 |
| 4,081,308 | 3/1978 | Skoultchi | 156/310 |
| 4,090,997 | 5/1978 | Patel et al. | 526/323.1 |
| 4,090,997 | 5/1978 | Purshottam et al. | 260/47 UA |
| 4,103,081 | 7/1978 | Repetto | 526/323.1 |
| 4,166,169 | 8/1979 | Purshottam et al. | 526/313 |
| 4,210,493 | 7/1980 | Stewart et al. | 203/8 |
| 4,316,000 | 2/1982 | Boeder | 526/301 |

FOREIGN PATENT DOCUMENTS 51-119050 10/1976 Japan .

Primary Examiner—Harry Wong, Jr.
Attorney, Agent, or Firm—Cruzan Alexander; Donald M. Sell; Walter N. Kirn

[57] ABSTRACT

Anaerobically-curing compositions are described which are free of peroxy initiators and inorganic salt initiators and which comprise (A) a polymerizable monomer; (B) as a first initiator component, a compound selected from the group consisting of organic sulfimide and perfluoroalkyl sulfonanilides; (C) as a second initiator component, a secondary or tertiary aromatic amine; and (D) a diaryl N-nitrosamine as a polymerization inhibitor. Methods are also described for stabilizing anaerobically-curing compositions through inclusion therein of a diaryl N-nitrosamine. The compositions are particularly suitable as adhesives and may be formulated as thread-locking adhesives or may be modified by the addition of various modifying polymers to obtain desired properties such as increased viscosities of pressure-sensitive properties.

14 Claims, No Drawings

ANAEROBICALLY CURING COMPOSITIONS

CROSS-REFERENCE TO RELATED APPLICATION

This application is a continuation-in-part of copending U.S. Ser. No. 203,684, now abandoned, which was filed on Nov. 3, 1980.

BACKGROUND OF THE INVENTION

This invention relates to anaerobically-curing compositions.

Anaerobically-curing compositions generally comprise polymerizable acrylate monomers and free-radical initiators. When maintained in an oxygen-containing environment, such compositions remain uncured (i.e., unpolymerized). However, in the absence of oxygen, such as when an anaerobically-curing composition is placed between surfaces which are in close engagement with one another (e.g. a nut and bolt), cure will ensue.

Anaerobically-curing compositions containing peroxy initiators (e.g., peroxides and hydroperoxides) or inorganic salt initiators (e.g., persulfates or perchlorates of ammonium, an alkali metal or an alkaline earth metal) are well-known in the art, having been described, for example, in U.S. Pat. Nos. 2,895,950 (Krieble) and 4,090,997 (Patel et al.) respectively. Commonly such compositions contain quinone-type compounds which act as polymerization inhibitors, thereby maintaining the compositions in an uncured state when stored in the presence of oxygen. Such compositions may also contain an organic sulfimide and/or an amine as an accelerator.

Unfortunately, anaerobically-curing compositions which contain peroxy initiators or inorganic salt initiators may possess certain disadvantages. For example, there is often the possibility of explosion whenever large amounts of peroxy compounds or inorganic salt initiators are handled, such as during manufacture of these compositions. Furthermore, unfortunately, peroxy compounds and inorganic salt initiators often decompose with time, thus resulting in a steadily decreasing ability of such compounds to initiate the polymerization of compositions containing them.

While one-part anaerobically-curing compositions containing polymerization initiators other than peroxy initiators or inorganic salt initiators are known in the art, such compositions may fail to exhibit a suitable balance of shelf-life stability versus cure-rate. In particular, while such compositions may exhibit suitable shelf-life stability in the presence of oxygen, they may cure at unsatisfactory rates when oxygen is excluded. Alternatively, such compositions often cure rapidly in the absence of oxygen, but may exhibit unsatisfactory shelf-lives.

The combination of saccharin and certain aromatic amines is known to be extremely effective in initiating rapid anaerobic cure of acrylate-containing compositions without the presence of additional peroxy or organic salt initiators. However, a one-part composition containing saccharin and an amine as the initiator combination generally will exhibit a less than suitable shelf-life unless a substantial amount of a quinone or hydroquinone polymerization inhibitor is added which unfortunately also results in a very slow rate of cure of the composition. Thus, two-part compositions, with one part containing the saccharin and the other part containing the amine, generally have been employed when it is desired to use that particular initiator combination, e.g., U.S. Pat. No. 3,658,624 (Lees).

One example of a one-part, anaerobically-curing composition containing saccharin and an amine as the initiator combination is described in Japanese Patent application No. JA 51-119050. Unfortunately, suitable shelf-life stability of that composition is only obtained when certain monomers such as trimethylol-propane trimethacrylate are employed as the polymerizable monomer. Since most commonly available monomers are unsuitable for employment in that composition, the composition is greatly limited in terms of practicality.

Thus, in view of the foregoing, it would be desirable to have a polymerization inhibitor which would permit employment of the particularly effective initiator combination of saccharin and an amine in one-part, anaerobically-curing compositions. A suitable polymerization inhibitor should impart suitable shelf-life stability to the composition and will, at the same time, not hinder free-radical initiated polymerization which ensues in the absence of oxygen on an active metal surface.

N-nitrosamines have been employed as antioxidants in the manufacture of rubber-containing articles, as additives in persulfate or perchlorate-containing anaerobically-curing sealants to limit corrosion of metallic substrates, e.g. U.S. Pat. Nos. 4,090,997 and 4,166,169 (both to Patel et al.), and as polymerization accelerators in dental resins, e.g. U.S. Pat. No. 2,558,139 (Knock). However, it has not heretobefore been proposed to use N-nitrosamines as polymerization inhibitors in anaerobically-curing compositions comprising an organic sulfimide and an amine as the initiator components.

BRIEF SUMMARY OF THE PRESENT INVENTION

The present invention provides novel anaerobically-curing compositions which are free of peroxy initiators (i.e., peroxides, hydroperoxides and the like) and inorganic salt initiators (i.e., persulfates or perchlorates of ammonium, an alkali metal or an alkaline earth metal) which comprise (A) a polymerizable monomer having at least one $\alpha,\beta$-unsaturated carboxyl functionality per molecule of monomer; (B) as a first initiator component, a compound selected from the group consisting of organic sulfimides and perfluoroalkyl sulfonamides; (C) as a second initiator component, a secondary or tertiary aromatic amine; and (D) as a polymerization inhibitor, a diaryl N-nitrosamine. The present invention also provides a novel method of stabilizing anaerobically-curing compositions through inclusion therein of a diaryl N-nitrosamine.

It has been found in the present invention that inclusion of certain N-nitrosamines in one-part, anaerobically-curing compositions permits employment of the desirable initiator combination which comprises an organic sulfimide or perfluoroalkyl sulfonanilide component and an aromatic amine component. These compositions exhibit suitable shelf-life (e.g. at least about 4 weeks at 120° F.) when stored in the presence of oxygen and cure rapidly to form strong bonds in the absence of oxygen. Furthermore, the compositions of the present invention may be stored for extended periods of time without fear of initiator decomposition.

The compositions of the present invention are one-part systems which are convenient to use since mixing of multiple portions is not required at the bonding site.

The compositions of the present invention are particularly suitable for bonding operations involving at least one active metal (e.g., copper and cold-rolled steel) and are further suitable for bonding less active metals (e.g., zinc and cadmium). The compositions are also suitable for bonding nonmetallic substrates (e.g. plastic, glass and wood) provided that appropriate primers are used to accelerate the cure to a useful rate.

The compositions of the present invention may be formulated as non-viscous, flowable liquids which are particulary useful in bonding operations involving well-mated surfaces (e.g., a nut and bolt). The compositions may also comprise various types of modifying polymers in order to obtain increased viscosities or thermoplastic or pressure-sensitive properties which render the compositions useful in a variety of other types of bonding operations.

DETAILED DESCRIPTION OF THE PRESENT INVENTION

The anaerobic compositions of the present invention comprise as a major constituent a polymerizable monomer (A) having at least one α,β-unsaturated carboxyl functionality

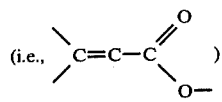

per molecule of monomer. Suitable monomers for employment in the compositions of the present invention include the diacrylates and dimethacrylates described in U.S. Pat. Nos. 3,043,820 (Krieble), 3,457,212 (Fukuoka et al.), 3,923,737 (George et al.), and 3,944,521 (Bradley et al.), incorporated herein by reference. Other suitable monomers include acrylate-terminated monomers such as the monomeric polyacrylate esters formed from organic polyisocyanates, such monomers being described, for example, in U.S. Pat. No. 3,425,988 (Gorman et al.), incorporated herein by reference. Particularly suitable polyfunctional acrylates and methacrylates include triethyleneglycol dimethacrylate, ethyleneglycol dimethacrylate, tetraethyleneglycol dimethacrylate, polyethyleneglycol diacrylate, polyethyleneglycol dimethacrylate, 1,3-butyleneglycol dimethacrylate, trimethylol propane trimethacrylate, neopentylglycol dimethacrylate, ethoxylated bisphenol A dimethacrylate, propoxylated bisphenol C dimethacrylate and bisphenol A bis(2-hydroxypropyl)dimethacrylate.

Monoacrylates and monomethacrylates are also suitable for employment in the compositions of the present invention as the polymerizable monomer. Suitable monoacrylates and monomethacrylates include cyclohexyl methacrylate, 2-ethylhexyl methacrylate, hydroxyethylmethacrylate, isooctyl acrylate and n-butyl acrylate.

Methacrylic acid and similar α,β-unsaturated carboxylic acids are also suitable for employment as monomers in the compositions of the present invention as are half-esters such as the 2-hydroxyethyl methacrylate half-ester of maleic acid. Other suitable half-esters include those described in U.S. Pat. Nos. 3,428,614 (Brownstein) and 4,080,238 (Wolinski et al.), incorporated herein by reference.

The compositions of the present invention may comprise a single type of polymerizable monomer or may comprise a blend of two or more different polymerizable monomers.

Commercially-obtained monomers, which typically contain conventional inhibitors of free-radical polymerization (e.g., quinone-type inhibitors), are suitable for employment in the compositions of the present invention. As discussed above, such conventional inhibitors fail to impart satisfactory shelf-life and cure rate characteristics to one part compositions which comprise, for example, a sulfimide and an amine. Thus, the diaryl N-nitrosamines described herein remain a necessary component of the compositions of the present invention even if these compositions also contain conventional inhibitors through employment of commercially-obtained monomers.

In order to enhance the shelf-life of the compositions of the present invention it may be desirable to remove metal ions, if such are present, from the polymerizable monomer. This may be particularly desirable in the event that commercially-obtained monomers, which often contain significant amounts of metal ions, are employed in these compositions. Removal of metal ions may be effected by means well known to those skilled in the art.

The compositions of the present invention comprise, as a first initiator component (B), about 0.1 to 20 parts by weight and most preferably 0.5 to 5 parts by weight of an organic sulfimide or a perfluoroalkyl sulfonanilide per 100 parts by weight of the polymerizable monomer (A) and, as a second initiator component (C), about 0.05 to 20 parts by weight and most preferably 0.2 to 5 parts by weight of an aromatic amine per 100 parts by weight of the polymerizable monomer (A).

Organic sulfimides (i.e., organic compounds containing the group

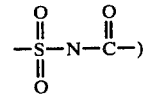

useful in the compositions of the present invention include those of the following general formula (I):

wherein: $R^1$ and $R^2$ are organic radicals, preferably hydrocarbon groups, comprising up to about 10 carbons. It should be understood that $R^1$ and $R^2$ of formula (I) may contain any substituent which does not adversely affect the compound for its intended use as an initiator component. It is also to be understood that $R^1$ and $R^2$ of formula (I) can be united to bond the sulfimide group in a heterocyclic or a polynuclear heterocyclic ring system.

Particularly suitable sulfimides for use as the first initiator component are saccharin (i.e., o-benzoic sulfimide) and

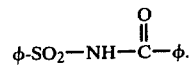

Suitable perfluoroalkyl sulfonanilides for use as the first initiator component have been described in U.S.

Pat. Nos. 4,005,141 (Moore et al.) and 4,076,519 (Harrington et al.), incorporated herein by reference, and include trifluoromethanesulfonanilide, 2-phenyltrifluoromethanesulfonanilide and N-2-naphthyltrifluoromethylsulfonanilide, all prepared in a closed reactor as described generally in Method A of said U.S. Pat. No. 4,005,141; 4-trifluoromethyltrifluoromethanesulfonanilide prepared as described in said U.S. Pat. No. 4,076,519; and 4-phenylthiotrifluoromethanesulfonanilide, prepared as described in said U.S. Pat. No. 4,005,141. Trifluoromethanesulfonanilide is the preferred perfluoroalkylsulfonanilide for employment in the compositions of the present invention.

One advantage of employing perfluoroalkyl sulfonanilides as the first initiator component is that they exhibit greater solubility in the polymerizable monomer (A) than saccharin, the preferred sulfimide.

The compositions of the present invention may comprise a single type of a sulfimide or perfluoroalkyl sulfonanilide, a mixture of two or more different sulfimides or perfluoroalkyl sulfonilides, or a mixture of one or more sulfimides with one or more perfluoroalkyl sulfonanilides.

Suitable amines for use as the second initiator component are secondary of tertiary aromatic amines. Examples of suitable secondary amines are 1,2,3,4-tetrahydroquinoline and N-methyl aniline.

Preferred tertiary aromatic amines are of the following general formula (II):

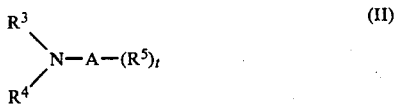

wherein:

$R^3$ and $R^4$ are each organic radicals, preferably hydrocarbon groups, comprising up to about 12 carbons;

A is a carbocyclic aromatic nucleus selected from the group consisting of phenyl and naphthyl radicals;

$R^5$ is an organic radical comprising up to about 5 carbons and is selected from the group consisting of alkyl and alkoxy radicals; and t is from 0 to 3 inclusive.

Particularly suitable tertiary aromatic amines of formula (II) are N,N-dimethyl-p-toluidine, N,N-diethyl-p-toluidine, N,N-dimethylaniline, N,N-dimethyl-p-anisidine, N,N-diethylaniline and N,N-bis-(2-hydroxyethyl)-p-toluidine.

The compositions of the present invention may comprise a single type of amine or may comprise a mixture of two or more different amines.

As an alternative to adding the sulfimide or perfluoroalkyl sulfonanilide component and the aromatic amine component as distinct initiator components to the compositions of the present invention, the respective preformed amine-salt of the two initiator components may be employed, the amine-salt being prepared in a manner analogous to the method described in U.S. Pat. No. 2,838,753 (Lal), incorporated herein by reference. Generally, greater amounts of the two initiator components as the amine-salt are required to effect a given rate of cure than if the two initiator components are added to the compositions of the present invention as distinct compounds.

It has been found in the present invention that diaryl N-nitrosamines (D), when added to one-part, anaerobically-curing compositions comprising the preferred initiator combinations described hereinbefore, will provide compositions which exhibit suitable shelf-life stability (e.g. at least about 4 weeks at 120° F.) when stored in the presence of oxygen and which cure rapidly (e.g. within about 1 hour) in the absence of oxygen. The preferred compositions of the present invention comprise about 0.01 to 3 parts by weight and preferably about 0.02 to 1.0 by weight of a diaryl N-nitrosamine per 100 parts by weight of the polymerizable monomer (A).

Suitable diaryl N-nitrosamines include those of the following general formula (III):

wherein: $R^5$ and $R^6$ are each a carbocyclic aromatic nucleus selected from the group consisting of unsubstituted phenyl radicals, substituted phenyl radicals, unsubstituted naphthyl radicals and substituted naphthyl radicals.

An example of a suitable diaryl N-nitrosamine for employment in the compositions of the present invention is 2-naphthyl phenyl-N-nitrosamine. The preferred diaryl N-nitrosamine for employment in the compositions of the present invention is N-nitrosodiphenylamine.

Compositions comprising the aforementioned components (A), (B), (C), and (D) generally exhibit low viscosity and are particularly useful for bonding well mated surfaces such as the threads of a nut and bolt. Fixturing of the surfaces involved in the bonding operation may be necessary when employing compositions comprising only components (A), (B), (C), and (D) until sufficient bond strength has developed. Fixture time (that is the time required to develop a bond between surfaces which will withstand forces exerted with "hand strength") will typically be within less than about 1 hour at room temperature.

In many bonding applications, it may be desirable to achieve bonding characteristics not obtainable with compositions comprising only components (A), (B), (C), and (D). Thus, the compositions of the present invention may further comprise up to about 950 parts by weight of various modifying polymers per 100 parts by weight of the polymerizable monomer (A). Modifying polymers which may be present in these compositions include polymers added to obtain desired viscosities. Other modifying polymers which may be present in these compositions include thermoplastic polymers and pressure-sensitive polymers, the latter also generally being thermoplastic in nature. Preferred modifying polymers are substantially nonreactive (i.e., will not generally be subject to free-radical-initiated polymerization under the anaerobic conditions typically used to cure the compositions of the present invention).

Polymers useful as modifying polymers for providing compositions exhibiting increased viscosities are well-known in the art and include cellulose acetate butyrates, polymethacrylates, phenoxy resins, polyesters and polyurethanes. A preferred modifying polymer for increasing viscosities of these composition is "PKHA Resin" (a phenoxy resin commercially available from Union Carbide). A particularly suitable amount of the modifying polymers for providing compositions exhibiting increased viscosities is up to about 25 parts by weight per 100 parts by weight of the polymerizable monomer (A).

Thermoplastic polymers useful as modifying polymers in these compositions are well-known in the art and include those described in U.S. Pat. No. 3,996,308 (Douek et al.), incorporated herein by reference. Examples of particularly suitable thermoplastic polymers include polyvinyl acetates (e.g. that available under the trade designation "AYAT Resin" from Union Carbide), phenoxy resins (e.g., that available under the trade designation "PKHJ Resin" from Union Carbide), polyesters (e.g. that available under the trade designation "Vitel 207" from B. F. Goodrich), polyurethanes (e.g. that available under the trade designation "Estane 5712" from B. F. Goodrich), and nitrile rubbers (e.g., that available under the trade designation "Hycar 1072" from B. F. Goodrich).

Pressure-sensitive polymers useful as modifying polymers in these compositions include those described in U.S. Pat. No. Re. 24,906 (Ulrich) and U.S. Pat. No. 4,113,792 (Pastor et al.), both incorporated herein by reference. Examples of particularly suitable pressure-sensitive polymers include copolymers of isooctyl acrylate and acrylic acid, copolymers of isobutyl acrylate and acrylic acid and copolymers of n-butylacrylate and acrylic acid, those copolymers preferably containing about 90% by weight of the respective alkyl acrylate and about 10% by weight of acrylic acid.

A particularly suitable amount of thermoplastic or pressure-sensitive modifying polymers for employment in the composition of the present invention is from about 25 to 500 parts by weight per 100 parts by weight of the polymerizable monomer (A).

Compositions of the present invention which comprise the various modifying polymers discussed above may further comprise the various tackifiers, plasticizers and the like which are well known in the art in order to obtain desired properties.

Compositions comprising modifying polymers may be conveniently applied to surfaces as viscous neat liquids, sheets, films, tapes and the like, or as solutions in suitable organic solvents. Depending on the type of modifying polymer employed in the composition, fixturing of the surfaces involved in the bonding operation may or may not be necessary.

It is understood that the compositions of the present invention may also comprise various other ingredients such as fillers, thickening agents, and the like which are well-known in the art.

When the compositions of the present invention are employed in bonding operations involving at least one active metal surface (e.g., copper and cold-rolled steel), cure will rapidly ensue at room temperature in the absence of oxygen. However, it is known that anaerobically-curing compositions, including those of the present invention, may cure only very slowly, if at all, when no active metal surfaces are involved in the bonding operation. Thus when the compositions of the present invention are to be employed in bonding operations involving relatively inactive metals (e.g., cadmium and zinc) or nonmetal substrates (e.g., plastic, glass and wood) or combinations thereof, it is often desirable or perhaps even necessary to employ an appropriate activator which is preapplied to at least one of the surfaces to be bonded. Such an activator can, of course, be employed to further accelerate cure when active metal surfaces are involved in the bonding operation.

Particularly suitable activators include compounds containing transition metal ions, examples of such activators including iron acetylacetonate, vanadium acetylacetonate and copper octoate. A preferred activator of this type is copper acetylacetonate. It may be desirable to employ an activator having the metal ion in a higher versus lower oxidation state. Other activators or primers which are well-known in the art may also be employed with the compositions of the present invention.

The activator may be applied to a substrate by means of a suitable vehicle. For example, the activator may be applied as a solution in a volatile organic solvent. A volatile organic solvent is desirable as a vehicle for the activator in order to insure rapid evaporation of the solvent and to thus reduce the possibility of entrapment of solvent between the surfaces being bonded as the bonding operation proceeds. A preferred solvent for use in the present invention is methylene chloride. Activators which are liquids or solids at the temperature at which the bonding operation is conducted may also be applied directly to a substrate without dissolution in a vehicle.

In employing a diaryl N-nitrosamine in the methods described herein for stabilizing anaerobically-curing compositions, the diaryl N-nitrosamine is simply combined with the other ingredients of the composition such that the total amount of the nitrosamine is present in an amount of between about 0.01 to 3 parts by weight, and preferably between about 0.02 and 1 parts by weight, per 100 parts by weight of the polymerizable monomer. When employing a diaryl N-nitrosamine in accordance with these methods, a diaryl N-nitrosamine will suitably stabilize compositions which are free of peroxy initiators and inorganic salt initiators as well as those which contain minor amounts of peroxy initiators and/or inorganic salt initiators in addition to initiator components (B) and (C).

In the following examples which will serve to illustrate the present invention, all parts are parts by weight and all percentages are percentages by weight, unless otherwise indicated.

TEST METHODS

Fixture Time—Test Method A

In testing the performance of a composition, one drop (about 0.05 cc) of the composition is applied to the threads of a cleaned ⅜ inch (0.95 cm) No. 16 plain finished steel bolt to which a mating nut is subsequently applied. The fixture time (i.e., the time at which the nut could no longer be unscrewed from the bolt using hand strength only) at room temperature is measured in minutes.

Break Away Torque—Test Method B

In further testing the performance of a composition, a nut and bolt which have been treated with the composition in a manner analogous to that described in Test A above are maintained at room temperature for 24 hours. The break away torque (i.e., the torque needed to loosen the nut from the bolt) is then measured in inch/pounds.

Accelerated Shelf-life Stability—Test Method C

In testing the accelerated stability of a composition, 50 cc of the composition is placed in a 75 cc polyethylene bottle which is then sealed with a screw cap. The bottle and contents are stored at 120° F. (49° C.) and the contents are observed periodically for evidence of gelation.

Overlap Shear—Test Method D

In testing the performance of a composition, the composition is applied (4 mils drawn) to aluminum strip which in turn is brought into contact with a second aluminum strip such that the area of adhesive bonding between the two strips measures 1 inch$^2$ (6.45 cm$^2$). The aluminum strips have previously been wiped with methyl ethyl ketone and have been primed with a 1% solution (w/w) of copper (II) acetylacetonate in methylene chloride. The bond is allowed to condition for 3 days at room temperature, at which time overlap shear value is determined using an Instron Dyamic Tester with a jaw separation rate of 0.2 inch (0.51 cm) per minute.

EXAMPLE 1

A suitable anaerobically-curing composition is prepared using the following ingredients:

| | Parts by Weight |
|---|---|
| Triethyleneglycol dimethacrylate (available under the trade designation "SR-205" from Sartomer Co.) | 100 |
| Saccharin | 0.9 |
| N,N—dimethyl-p-toluidine | 0.7 |
| N—nitrosodiphenylamine | 0.12 |

The composition comprising the above ingredients is prepared by combining the N,N-dimethyl-p-toluidine and the N-nitrosodiphenylamine with the triethyleneglycol dimethacrylate, followed by addition and mixing of the saccharin with the resulting mixture.

When the above composition is tested in accordance with Test A, the fixture time is less than about 60 minutes.

When the above composition is tested in accordance with Test B, the break away torque is about 170 inch/pounds (1156 cm/kg).

When the above composition is tested in accordance with Test C, no gelation of the composition is observed at 5 weeks. By way of comparison, in the absence of N-nitrosodiphenylamine, the composition will gel within less than 8 hours when tested in accordance with Test C.

EXAMPLE 2

Another suitable anaerobically-curing composition is prepared using the following ingredients combined in accordance with the procedure of Example 1:

| | Parts by weight |
|---|---|
| Triethyleneglycol dimethacrylate | 100 |
| Saccharin | 0.75 |
| 1,2,3,4-tetrahydroquinoline | 0.55 |
| N—nitrosodiphenylamine | 0.36 |

When the above composition is tested in accordance with Test A of Example 1, fixture time is less than about 60 minutes.

When the above composition is tested in accordance with Test B of Example 1, the break away torque is about 140 inch/pounds (952 cm/kg).

EXAMPLE 3

Another suitable anaerobically-curing composition is prepared using the following ingredients combined in accordance with the procedure of Example 1:

| | Parts by weight |
|---|---|
| Triethyleneglycol dimethacrylate | 100 |
| 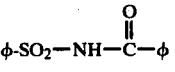 | 2.2 |
| N,N—dimethyl-p-toluidine | 1.4 |
| N—nitrosodiphenylamine | 0.10 |

When the above composition is tested in accordance with Test A, fixture time is less than about 100 minutes.

When the above composition is tested in accordance with Test B, the break away torque is about 138 inch/pounds (938 cm/kg).

When the above composition is tested in accordance with Test C, no gelation of the composition is observed at 5 weeks.

EXAMPLE 4

Another suitable anaerobically-curing composition is prepared using the following ingredients combined in any order:

| | Parts by weight |
|---|---|
| Triethyleneglycol dimethacrylate | 100 |
| Trifluoromethanesulfonanilide | 2.2 |
| N,N—dimethyl-p-toluidine | 1.4 |
| N—nitrosodiphenylamine | 0.25 |

When the above composition is tested in accordance with Test A, fixture time is less than about 60 minutes.

When the above composition is tested in accordance with Test B, the break away torque is 128 inch/pounds (870 cm/kg).

When the above composition is tested in accordance with Test C, no gelation of the composition is observed at 5 weeks. By way of comparison, in the absence of N-nitrosodiphenylamine, the composition will gel in less than 12 hours when tested in accordance with Test C.

EXAMPLE 5

Another suitable anaerobically-curing composition is prepared from the following ingredients combined in any order:

| | Parts by weight |
|---|---|
| Triethyleneglycol dimethacrylate | 100 |
| 4-phenylthiotrifluoromethane-sulfonanilide | 1.70 |
| N,N—dimethyl-p-toluidine | 0.70 |
| N—nitrosodiphenylamine | 0.36 |

When the above composition is tested in accordance with Test A, fixture time is less than about 60 minutes.

When the above composition is tested in accordance with Test B, the break away torque is about 153 inch/pounds (1040 cm/kg).

When the above composition is tested in accordance with Test C, no gelation of the composition is observed at 5 weeks.

EXAMPLE 6

Another suitable anaerobically-curing composition is prepared from the following ingredients combined in accordance with Example 1:

|  | Parts by Weight |
| --- | --- |
| Triethyleneglycol dimethacrylate | 100 |
| Saccharin | 0.9 |
| N,N—dimethyl-p-toluidine | 0.7 |
| 2-naphthyl-phenyl-N—nitrosamine | 0.36 |

(prepared by the dropwise addition of concentrated $H_2SO_4$ (7.2 grams) to a warm solution of phenylnaphthylamine (26 grams) in 250 milliliters of ethanol. The resulting solution is stirred at 35° C. for 45 minutes, followed by the dropwise addition of 22.5 grams of 40% aqueous $NaNo_2$ (weight/weight). The solution is stirred for 1 hour and is then diluted with 500 milliliters of water and neutralized with aqueous KOH. After cooling with ice and stirring for an additional hour, 2-naphthyl-phenyl-N-nitrosamine (25 g) is obtained by filtration.)

When the above composition is tested in accordance with Test A the fixture time is less than about 60 minutes.

When the above composition is tested in accordance with Test C, no gelation of the composition is observed at 5 weeks.

EXAMPLE 7

A suitable anaerobically-curing composition comprising a pressure-sensitive polymer is prepared from the following ingredients:

|  | Parts by weight |
| --- | --- |
| Isooctylacrylate (90% by weight)/acrylic acid (10% by weight) copolymer (prepared in accordance with the procedures of U.S. Pat. No. Re. 24,906 (Ulrich), incorporated herein by reference) | 7 |
| "Epocryl 12" (a reaction product of methacrylic acid and an epoxy resin; commercially available from Shell Chemical Co.) | 2 |
| Methacrylic acid | 2 |
| Saccharin | 0.2 |
| N,N—dimethyl-p-toluidine | 0.2 |
| N—nitrosodiphenylamine | 0.04 |
| Methyl ethyl ketone | 7.6 |

When the above composition is tested in accordance with Test D, the overlap shear value is about 1000 pounds per square inch (70.3 kg/cm²).

The above composition exhibits suitable stability.

EXAMPLE 8

By way of comparison with the composition of Example 1, an anaerobically-curing composition is prepared from the following ingredients combined in accordance with the procedure of Example 1:

|  | Parts by weight |
| --- | --- |
| Triethyleneglycol dimethacrylate | 100 |

-continued

|  | Parts by weight |
| --- | --- |
| Saccharin | 0.9 |
| N,N—dimethyl-p-toluidine | 0.7 |
| Hydroquinone | 0.03 |

When the above composition is tested in accordance with Test A, the fixture time is less than about 60 minutes.

However, when the above composition is tested in accordance with Test C, gelation is observed within less than about 8 hours.

When 0.08 parts by weight of hydroquinone is used instead of the 0.03 parts by weight mentioned above, no gelation occurs at 2 weeks when the composition is tested in accordance with Test C. However, the fixture time, as measured in accordance with Test A is greater than 1.5 hours.

I claim:

1. An anaerobically-curing composition free of peroxy intiators and inorganic salt initiators, said composition comprising:
   (A) 100 parts by weight of a polymerizable monomer having at least one α,β-unsaturated carboxyl functionality per molecule of monomer;
   (B) as a first initiator component, about 0.1 to 20 parts by weight of a compound selected from the group consisting of organic sulfimides and perfluoroalkyl sulfonanilides;
   (C) as a second initiator component, about 0.05 to 20 parts by weight of a secondary or tertiary aromatic amine; and
   (D) as a polymerization inhibitor, about 0.01 to 3 parts by weight of a diaryl N-nitrosamine.

2. A composition in accordance with claim 1, wherein said monomer is selected from the group consisting of triethyleneglycol dimethacrylate, ethyleneglycol dimethacrylate, tetraethyleneglycol dimethacrylate, polyethyleneglycol dimethacrylate, polyethyleneglycol diacrylate, 1,3-burylenegycol dimethacrylate, trimethylol propane trimethacrylate, neopentylglycol dimethacrylate, ethoxylated bisphenol A dimethacrylate, propoxylated bisphenol C dimethacrylate, bisphenol A bis (2-hydroxypropyl)dimethacrylate, cyclohexyl methacrylate, 2-ethylhexyl methacrylate, hydroxyethyl methacrylate, isooctyl acrylate, n-butyl acrylate, methacrylic acid, the 2-hydroxyethyl methacrylate half-ester of maleic acid, and monomeric polyacrylate esters formed from isocyanates.

3. A composition in accordance with claim 1, wherein said first initiator component is a sulfimide of the formula

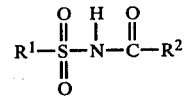

wherein: $R^1$ and $R^2$ are organic radicals comprising up to about 10 carbons.

4. A composition in accordance with claim 3, wherein said sulfimide is selected from the group consisting of o-benzoic sulfimide and

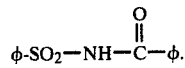

5. A composition in accordance with claim 1, wherein said first initiator component initiator is a perfluoroalkyl sulfonanilide.

6. A composition in accordance with claim 5, wherein said perfluoroalkyl sulfonanilide is selected from the group consisting of trifluoromethanesulfonanilide, 4-trifluoromethyltrifluoromethanesulfonanilide, 2-phenyltrifluoromethanesulfonanilide, 4-phenylthiotrifluoromethanesulfonanilide and N-2-naphthyltrifluoromethylsulfonanilide.

7. A composition in accordance with claim 1, wherein said amine is a tertiary aromatic amine of the formula:

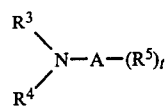

wherein:
R$^3$ and R$^4$ are each hydrocarbon groups comprising up to about 12 carbons;
A is a carbocyclic aromatic nucleus selected from the group consisting of unsubstituted phenyl radicals, substituted phenyl radicals, unsubstituted naphthyl radicals and substituted naphthyl radicals;
R$^5$ is an organic radical comprising up to about 5 carbons and is selected from the group consisting of alkyl and alkoxy radicals; and
t is from 0 to 3 inclusive.

8. A composition in accordance with claim 1, wherein said second initiator component is selected from the group consisting of N,N-dimethyl-p-toluidine, N,N-diethyl-p-toluidine, N,N-dimethylaniline, N,N-dimethyl-p-anisidine, N,N-diethylaniline, N,N-diethylaniline, N,N-bis-(2-hydroxyethyl)-p-toluidine and 1,2,3,4-tetrahydroquinoline.

9. A composition in accordance with claim 1, wherein said polymerization initiator comprises the amine-salt of said first initiator component and said second initiator component.

10. A composition in accordance with claim 1, wherein said diaryl N-nitrosamine is of the formula

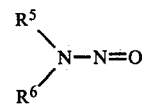

wherein: R$^5$ and R$^6$ are each a carbocyclic aromatic nucleus selected from the group consisting of unsubstituted or substituted phenyl and naphthyl radicals.

11. A composition in accordance with claim 10, wherein said N-nitrosamine is selected from the group consisting of N-nitrosodiphenylamine and 2-naphthyl-phenyl-N-nitrosamine.

12. A composition in accordance with claim 1, wherein said first initiator component is o-benzoic sulfimide, said second initiator component is N,N-dimethyl-p-toluidine and said N-nitrosamine is N-nitrosodiphenylamine.

13. A composition in accordance with claim 1, wherein said first initiator component is present in an amount of about 0.5 to 5 parts by weight, said second initiator component is present in an amount of about 0.2 to 5 parts by weight and said N-nitrosamine is present in an amount of about 0.02 to 1 parts by weight.

14. A method for stabilizing an anaerobically-curing composition during storage in the presence of air, said method comprising including in said composition a diaryl N-nitrosamine, wherein said composition comprises:
(A) 100 parts by weight of a polymerizable monomer having at least one α,β-unsaturated carboxyl functionality per molecule of monomer;
(B) as a first initiator component, about 0.1 to 20 parts by weight of a compound selected from the group consisting of organic sulfimides and perfluoroalkyl sulfonanilides; and
(C) as a second initiator component, about 0.05 to 20 parts by weight of a secondary or tertiary aromatic amine;
and wherein said N-nitrosamine is included in an amount of about 0.01 to 3 parts by weight per 100 parts by weight of said monomer.

* * * * *